No. 869,408. PATENTED OCT. 29, 1907.
G. W. BARNETT.
GRADING MACHINE.
APPLICATION FILED OCT. 30, 1906.

Witnesses
E. K. Reichenbach.
H. E. Chandler

Inventor
G. W. Barnett.
By Chandler & Chandler
Attorneys.

No. 869,408. PATENTED OCT. 29, 1907.
G. W. BARNETT.
GRADING MACHINE.
APPLICATION FILED OCT. 30, 1906.

Witnesses
C. H. Reichenbach.
H. E. Chandlee

Inventor
G. W. Barnett.
By Chandlee & Chandlee
Attorneys

No. 869,408. PATENTED OCT. 29, 1907.
G. W. BARNETT.
GRADING MACHINE.
APPLICATION FILED OCT. 30, 1906.

Witnesses
E. K. Reichenbach
A. E. Chandler

Inventor
G. W. Barnett.
By Chandler & Chandler
Attorneys

UNITED STATES PATENT OFFICE.

GEORGE W. BARNETT, OF LOUISE, TEXAS.

GRADING-MACHINE.

No. 869,408.  Specification of Letters Patent.  Patented Oct. 29, 1907.

Application filed October 30, 1906. Serial No. 341,246.

*To all whom it may concern:*

Be it known that I, GEORGE W. BARNETT, a citizen of the United States, residing at Louise, in the county of Wharton, State of Texas, have invented certain new and useful Improvements in Grading-Machines; and I do hereby declare the following to be a full, clear, and exact description of the invention, such as will enable others skilled in the art to which it appertains to make and use the same.
This invention relates to excavators and more particularly to those adapted for use in grading and in the construction of dikes or levees and has for its object to provide a machine of this kind which will be especially adapted for use in the above mentioned connection, and which will include a novel arrangement of parts permitting adjustment of the machine to suit different conditions.

Another object is to provide an arrangement which will permit of the passage of the traction wheel over obstacles, without interference with the operation of the machine.

Other objects and advantages will be apparent from the following specification, and it will be understood that changes in the specific structure shown and described may be made, without departing from the spirit of the invention.

In the drawings forming a portion of this specification and in which like numerals of reference indicate similar parts in the several views.

Figure 1:
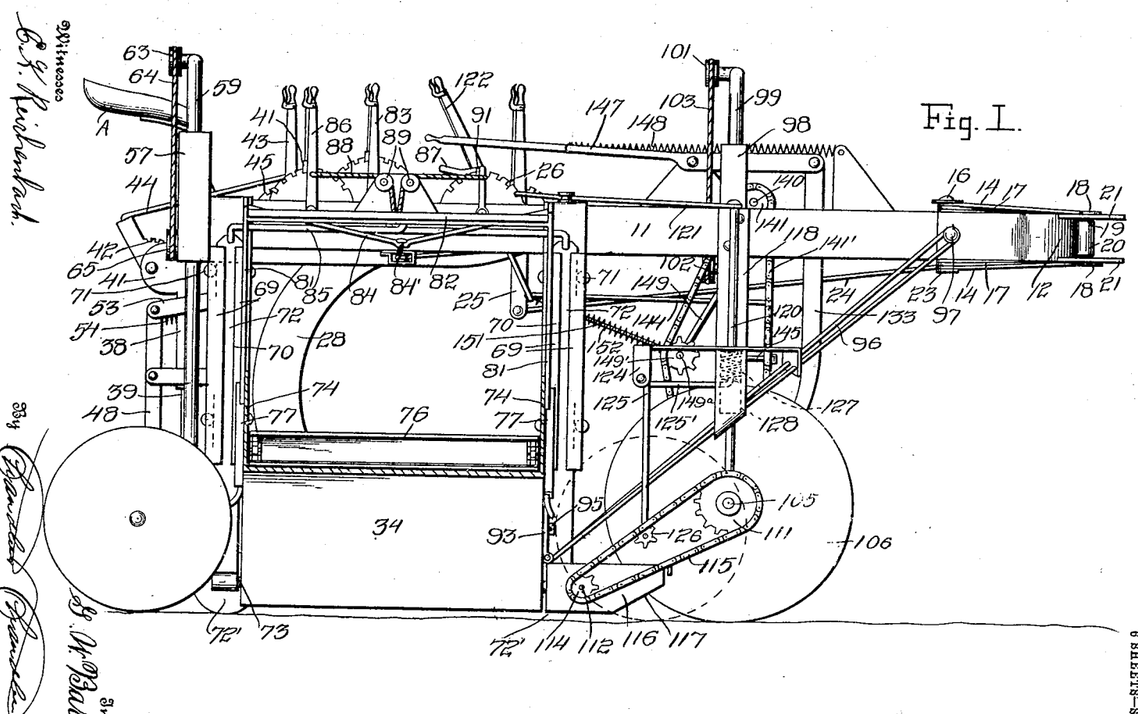
Figure 1 is an elevational view of the carrier side of the grader, the outer end portion of the carrier being broken away.
Figure 2:
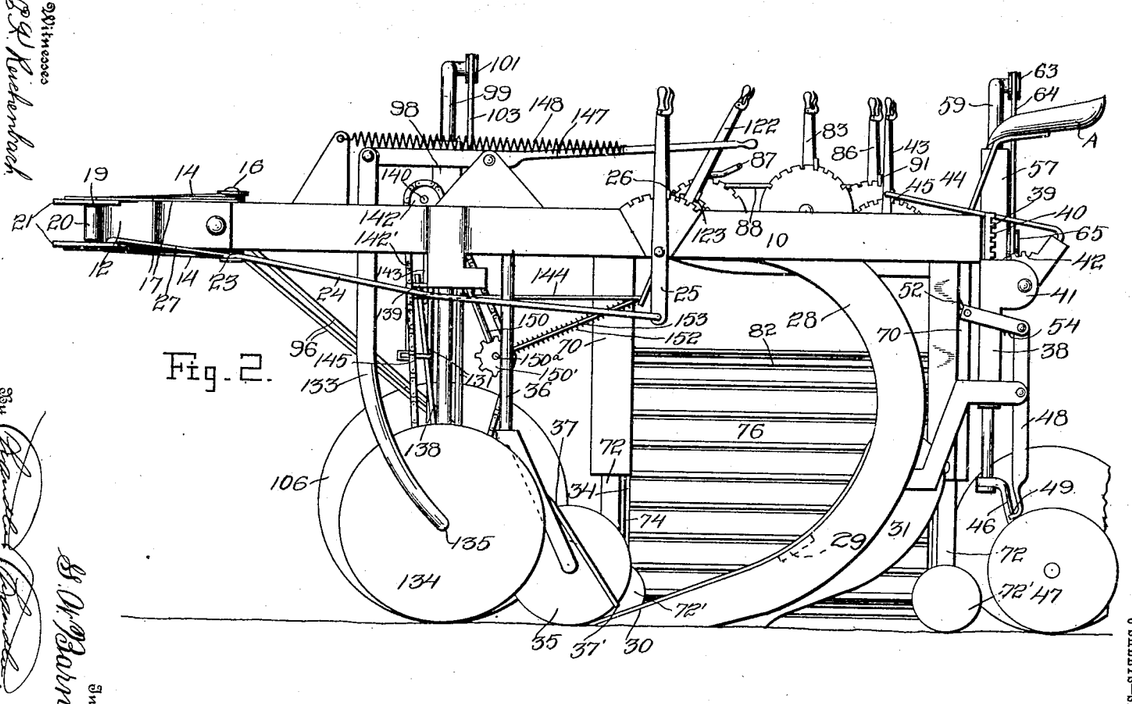
Fig. 2 is a view of the opposite side of the invention from Fig. 1.
Figure 3:
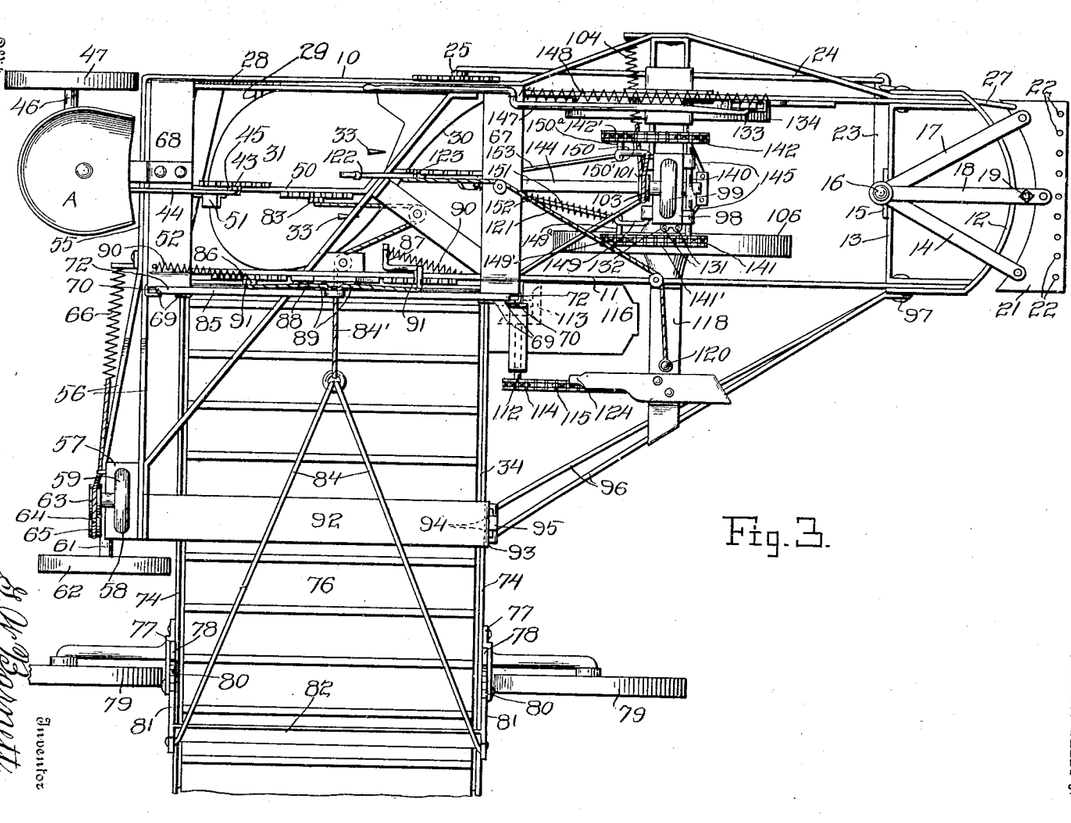
Fig. 3 is a top plan view, part of the carrier being broken away.
Figure 4:
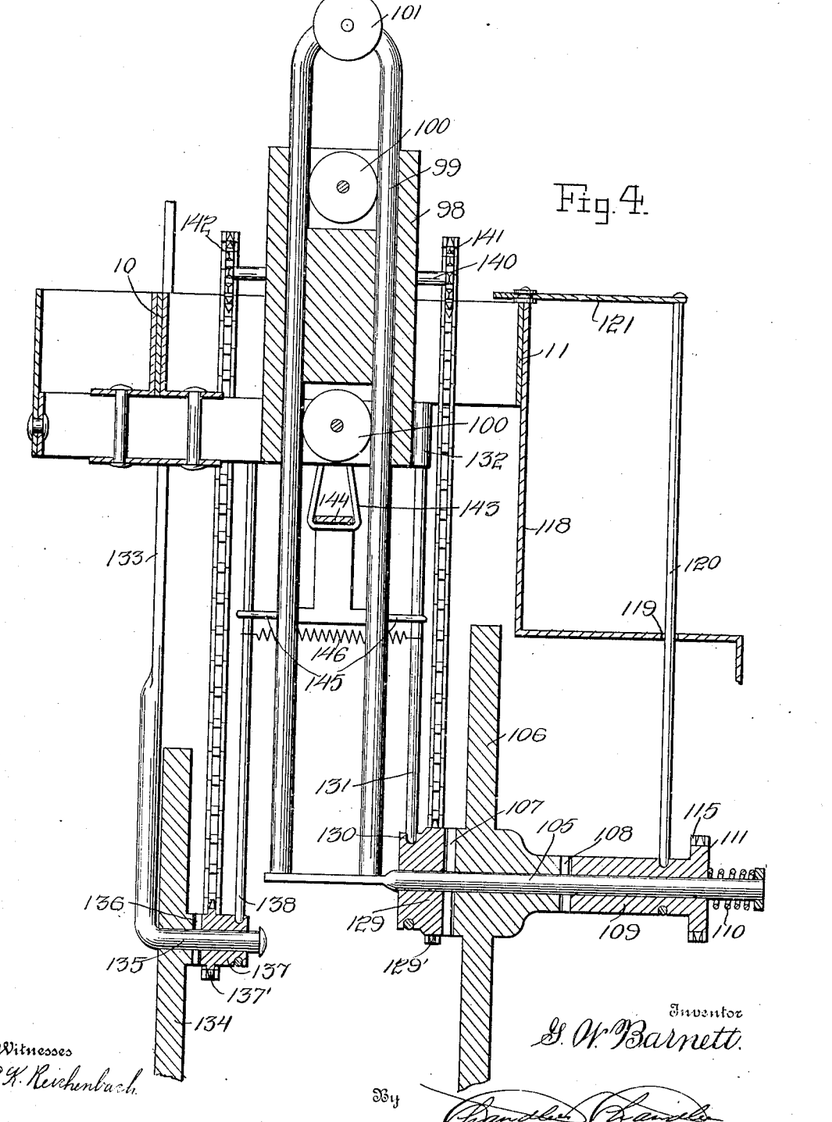
Fig. 4 is a vertical partially sectional view, taken through the shaft and slide of the traction wheel and the supporting wheel, the clutch operating mechanism being shown in elevation.
Figure 5:
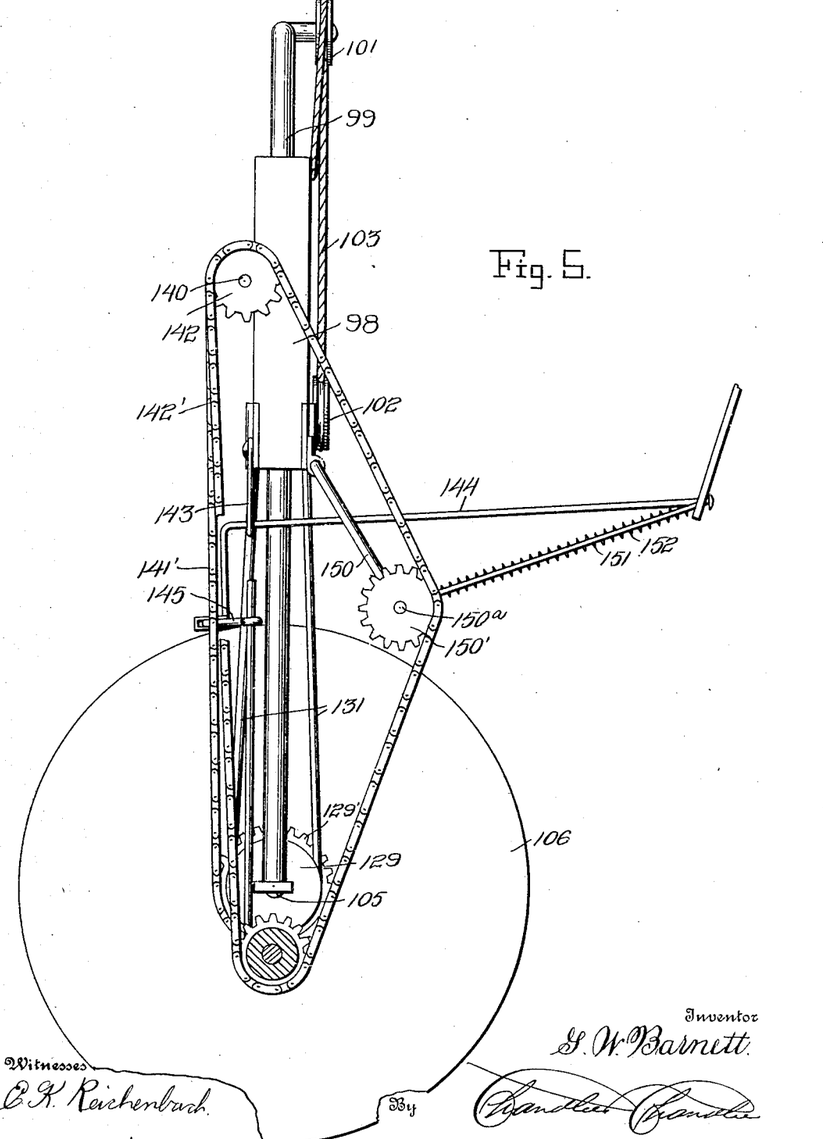
Fig. 5 is a detail view showing the clutch operating mechanism, the idler sprockets and adjacent mechanism in side elevation.
Figure 6:
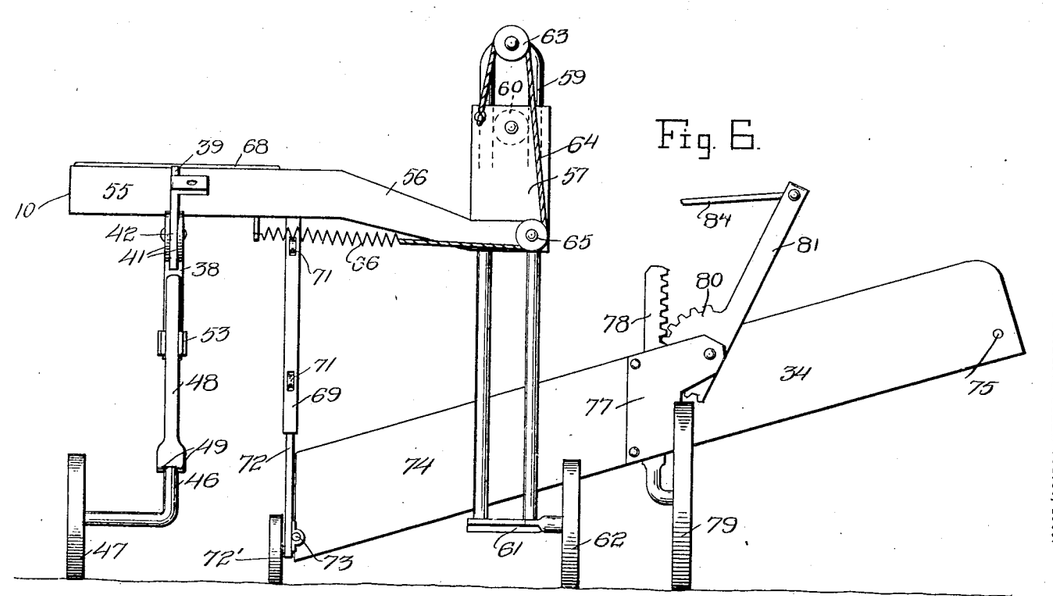
Fig. 6 is a rear elevation.
Figure 7:
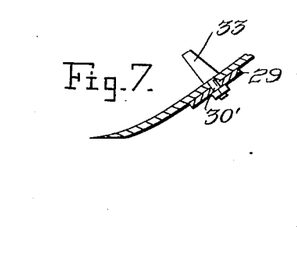
Fig. 7 is a sectional view of the share and mold board, illustrating the sod-cutting knives.

Referring now to the drawings, the present invention comprises a frame including parallel longitudinally extending side beams 10 and 11, which are connected at their forward ends by a horizontally disposed arcuate connecting member 12, having its convex face directed forwardly, and secured between the beams 10 and 11 adjacent to their forward ends there is a cross plate 13, having a vertical bearing 15 at its center. Engaged in this bearing 15 for pivotal movement, there is a vertical pin 16, having secured to its ends divergent pairs of forwardly extending arms 14 and 17 respectively, the arms of each pair lying in a common vertical plane.

A central pair of arms 18 are secured one to each end of the pin, and extend forwardly to have secured therebetween forwardly of the arcuate member 12 a vertical pin 19, which has revolubly mounted thereupon a roller 20 bearing against the forward face of the member 12, and secured to the forward ends of the several arms, are upper and lower clevis plates 21, having vertically alining pairs of openings 22 therein arranged in series transversely of the machine.

The plates 21, with the arms to which they are secured, thus form a clevis pivoted for movement transversely of the machine, such movement being effected through the movement of an arm 23 connected at one end to the pin 16 and pivoted at its opposite end to a rearwardly-extending rod 24 which is, in turn, connected to an operating lever 25, mounted upon the machine frame, the lever being retained in adjusted position through the rack-and-dog mechanism 26 in the usual manner.

A brace rod 27 connects the outer end of the arm 23 with the forward portion of the clevis, as shown.

A stock 28 depends from the rearward portion of the beam 10 and has secured to its lower portion an inwardly extending strap 29, to which a share 30 and mold board 31 are secured, the share being secured to the frame 29 by means of bolts 30', having blades 33 at their upper ends, which extend above the share and in position to cut sod passing to the mold board, as will be readily understood.

The stock, share and mold board form a plow, as will be of course understood, located to throw the earth toward the opposite side of the machine from the beam 10 and a laterally extending elevator carrier 34 is arranged to receive earth from the plow as shown in the drawings, and as will be subsequently described.

A sod cutting wheel 35 runs in advance of the plow, and is carried by a stock 36, which depends from the beam 10, and a yoke 37 is carried by the stock, embracing the wheel 35 and extending downwardly and rearwardly thereover to lie with its bight 37' across the periphery of the wheel 35, to clean the latter.

A guide 38 is located at the rearward portion of the frame, and has slidably mounted therein a vertical member 39 having a rearward directed rack face 40 at its upper portion, and rearwardly extending ears 41 are carried by the guide and have pivoted therebetween a rack segment 42 engaging the rack face 40, for movement of the member 39 vertically when the segment is moved, and a hand lever 43 is connected with the segment by means of a link 44, for movement of the segment. A rack-and-dog 45 is provided to hold the lever 43 at different points of its movement.

An arm 46 is pivoted to the lower end of the member 39 for horizontal movement and has mounted thereupon a vertical tracker wheel 47, which may thus swing laterally, and a latch member 48 is provided and is pivoted to the guide 38 for movement into and out of position to hold the arm 46 against swinging movement, this latch member having teeth 49 arranged to receive the arm therebetween, and it is pivoted for movement longitudinally of the machine into and out of arm-engaging position.

A central member 50 is mounted in the frame and pivoted to this member, there is a foot lever 51 connected with the latch member 48 by means of a link 52 and a yoke 53, the latter embracing the guide 38, for movement of the latch member, and the latch member is held yieldably by means of a helical spring 54 in arm-engaging position. As shown, the upper end of the latch member is pivoted between the detached ends of the legs of the yoke 53.

The frame includes a transverse rearward portion 55 to which the upper end of the guide 38 is secured, and at its rearward end, there extend outwardly from the side beams 11 a pair of spaced arms 56, having secured between their outer ends, a guide 57, which extends vertically and which receives slidably in its passage 58, a vertical yoke-shaped slide 59, which lies with its legs at opposite sides of rollers 60, mounted within the passage 58.

To the lower detached ends of the slide, there is secured a horizontal spindle 61, upon which there is mounted a ground wheel 62, these portions lying in the rear of the elevating carrier mentioned above.

Upon the bight of the slide 59, there is journaled a vertical pulley 63, which receives a cable 64, secured at one end to the guide 57, and extending upwardly and over the pulley 63, then outwardly and downwardly and under a pulley 65, mounted upon the rearward arms 56, the cable extending inwardly upon the last named pulley and being secured to a helical spring 66, connected with the frame. It will thus be seen that the slide 59 is held yieldably against upward movement under normal conditions, but that, because of the arrangement just described, the wheel 62 may rise to pass over obstructions in its path.

A pair of longitudinally spaced transversely extending front and rear members 67 and 68 respectively are secured upon the beams 10 and 11, at the rearward portions thereof, and have their end portions turned downwardly over the outer face of the beam 11, these end portions having edge portions 69 which are turned inwardly toward each other and in spaced relation to the intermediate portions of the end portions to form vertical guides, 70, rollers 71 being journaled in the side portions of the guides to receive vertical supporting members 72, which are movable longitudinally in the guides. These supporting members are thus in spaced relation longitudinally of the machine, and they have journaled thereupon at their lower ends a horizontally extending shaft 73, upon which is pivotally mounted the inner end of the elevating carrier 34.

The shaft 73 extends across the carrier, as shown, and is journaled in the side walls 74 of the carrier, in the outer ends of which there is journaled a shaft 75 receiving with the shaft 73 the apron 76 of the carrier. Vertical guides 77 are mounted one upon each wall 74 of the carrier and have slidably mounted therein rack bars 78, with the lower ends of which supporting wheels 79 are revolubly connected. Rack segments 80 are pivoted adjacent to the rack bars and mesh with the latter, for vertical movement of the rack bars in the guides when the segments are moved, and upwardly extending arms 81 are carried by the segments, and are connected by a cross strap 82 above the carrier.

A lever 83 is pivoted upon the frame, and there are connections 84 between this lever and the arms 81 for movement of the latter to move the segment when the lever is moved. The connections 84 include a cable 84', and it will be seen from the drawings that when the lever 83 is operated to draw the cable, the rack bars and wheels 79 are moved downwardly to raise the outer portion of the carrier 34, and that when the cable 84' is slackened, the weight of the outer end of the carrier will move it downwardly with respect to the wheels 79.

The upper ends of the members 72 are connected by a cross arm 85, and mounted upon the beam 11 there is a hand lever 86 and a foot lever 87, located and arranged for simultaneous operation by one person, and which are connected with the cross arm 85 by means of cables 88 passing over pulleys 89. It will thus be seen that the two levers may be operated to raise the members 72 and the inner end of the carrier, and springs 90 are arranged to aid in this lifting, a latch mechanism 91 being provided for each lever to hold it against movement by its spring.

A member 92 extends forwardly from the guide 57 and has a downwardly turned forward end portion 93 provided with a longitudinal slot 94, which receives slidably a pin 95 which extends outwardly from the forward wall 74 of the carrier, and a brace member 96 is connected with the lower end of the portion 94 and extends diagonally to the forward end of the beam 11, to which it is secured, by one of the bolts 97 holding the cross member 15, and thus this member 96 acts as a side draft bar.

In the forward portion of the frame there is mounted a vertical guide 98, similar to the guide 57, and having slidably engaged therein a yoke-shaped slide 99, rollers 100, being mounted in the guide and receiving the legs of the slide thereagainst, this arrangement being thus identical with that previously described in connection with the guide 57, and pulleys 101 and 102 correspond in location and arrangement to the pulleys 63 and 65, a cable 103 being engaged with these pulleys, and having secured thereto a spring 104 corresponding to the spring 66 and having one end fixed to the frame of the machine. The slide 99 is thus held yieldably against upward movement.

Secured to the lower ends of the legs of the slide, there is a laterally extending spindle 105, projecting toward the carrier side of the machine, and loosely mounted upon this spindle, there is a traction wheel 106, having secured thereto inner and outer clutch members 107 and 108 respectively. A clutch member 109 is slidably mounted upon the spindle outwardly of the member 108, for movement into and out of engagement with the latter, and a spring 110 is arranged to hold the clutch member 109 yieldably in operative relation to the clutch member 108. A sprocket 111 is carried by the member 109 and drives the receiving shaft 112 of a transmission gear 113 through the medium of a sprocket 114 carried by this shaft, and a chain 115. The gear 113 transmits power to the shaft 73, to drive the elevating carrier 34 as will be understood, and the gear is inclosed in a box 116, having a downwardly and rearwardly beveled forward face 117 to allow the box to pass over slight obstructions in its path. As shown, the box is carried by the lower end of the forward member 72, and each of these members 72 is provided with a ground wheel 72'.

A bracket 118 is secured to the beam 11, and extends outwardly therefrom, this bracket having a vertical opening 119 therein, in which there is engaged a vertical rod 120, connected at its lower end for movement of the clutch member 109 longitudinally upon the spindle 105, while permitting rotation of the clutch member.

The upper end of the rod 120 is connected by means of a cable 121 with a hand lever 122 pivoted in the frame and provided with a rack-and-dog mechanism 123 to hold it at different points of its movement. It will thus be seen that when the lever 122 is moved to draw upon the cable 121, the rod 120 will be rocked in the opening 119 to move the lower portion of the rod outwardly and throw the clutch member 109 out of engagement with the clutch member 108, to throw the carrier 34 out of gear.

The bracket 118 includes an arm 124 to which there is pivoted a lever 125, which extends downwardly, and which has journaled upon its lower end an idler sprocket 126, engaging beneath the upper portion of the chain 115, and a forwardly extending finger 125' is carried by the lever 125 and extends into a vertical guide included in the bracket 118, and indicated at 128, this finger 125' having its extremity turned upwardly within the guide, and engaged in a helical spring 127, resting at its upper end against a bracket 118 to hold the lever with the idler sprocket yieldably against the chain.

Slidably mounted upon the spindle 105, inwardly of the wheel 106, there is a clutch member 129, movable into and out of operative relation to the clutch member 107, and this clutch has formed therein a circumscribing groove 130 in which there is engaged the bight of a yoke 131, the legs of which extend upwardly and are slidably engaged at their upper ends in eyes 132 carried by the guide 98.

Slidably connected with the beam 10 at the forward portion thereof for vertical movement, there is a vertically extending stock 133, having a supporting wheel journaled at its lower end, as shown at 134, in transverse alinement with the traction wheel 106.

The supporting wheel 134 is journaled upon the inwardly turned lower end portion 135 of the stock 133, and carries upon its inner face, a clutch member 136, a clutch member 137 being slidably mounted upon the portion 135 for movement into and out of coöperative relation to the member 136, and having connected therewith an upwardly extending rod 138 for movement of the member slidably, this rod being engaged in an eye 139, connected with the guide 98.

Sprockets 129' and 137' are carried by the clutch members 129 and 137 respectively, and journaled above these sprockets, there is a shaft 140 upon which are fixed a pair of sprockets 141 and 142 respectively, these last named sprockets having engaged therewith chains 141' and 142' which are engaged with the sprockets 129' and 137' respectively.

A hanger 143 is secured to the guide 98, depending therefrom, and engaged in this hanger, there is an arm 144 which is turned downwardly forwardly of the hanger and which extends rearwardly to the lever 122, to which it is pivoted below the pivot point of the lever. A pair of links 145 are pivoted to the forward end of the arm 144, and one leg of the yoke 131 is slidably engaged in one of these links at the outer end thereof, while the rod 138 is similarly engaged in the other link. It will thus be seen that when the lever 122 is moved rearwardly at its upper portion, the arm 144 will be thrown forwardly, which will move the links 145 out of alinement and draw the yoke 131 and rod 138 together against the action of an open helical spring 146 located between the yoke and rod to throw the sprocket chains 141' and 142' out of gear with the supporting and ground wheels, as will be readily understood, this spring holding the clutches normally in operative position.

A hand lever 147 is pivoted upon the frame and is connected with the upper end of the stock 133 for movement of the supporting wheel vertically, and a spring 148 is arranged to hold the latter yieldably against upward movement at a predetermined point. It will be seen, however, that when the lever 122 has been operated to throw the clutches out of operative relation as just described, the hand lever 147 may be operated to throw the supporting wheel downwardly, thus elevating the plow described in the foregoing.

A pair of downwardly and rearwardly extending hangers 149 and 150 are independently pivoted to the guide 98, and these hangers include outwardly extending stub shafts 149ª and 150ª at their lower ends, upon which are journaled idler sprockets 149' and 150' which engage the forward faces of the adjacent portions of the chains 141' and 142'.

A link 151 is carried by the lower end of the lever 122 and is slidably connected with the lower end of the hanger, 149, and a helical spring 152 is engaged with this link 151, and is connected at its ends with the hanger 149 and with the lever 122, this hanger being thus held yieldably against forward movement, so that when the traction wheel is moved upwardly by an obstruction in its path, or in other manner, the spring 152 will move the idler 149' rearwardly to take up the slack of the chain. The other hanger 150 is connected with the lower end of the lever 122 by a link 153, for movement of the hanger with the lever. It will thus be seen that when the lever 122 is moved rearwardly, to throw the supporting and traction wheels out of gear with each other, the chains 141' and 142' will be slackened to allow the wheels to move downwardly, when the plow is elevated, as previously mentioned. At the same time, the rearward movement of the lever 122 will throw the clutch member 109 out of operative position, so that the elevating carrier 35 is operated only when the plow is in the ground.

It will thus be seen that as the machine is moved over the ground, the plow will excavate earth and throw it into the carrier, the latter elevating it and discharging it at the side of the machine, and through the medium of the lever 83, the outer end of the carrier may be raised as the dike or other structure increases in height.

It is thought that the operation of the machine will be fully and easily understood without detailed description.

As will be observed, the supporting and traction wheels are positively connected through the medium of the shaft 140 so that both of the wheels yield power which is transmitted to the carrier.

The latch member 48 is of course moved to release the tracker wheel when the machine is to be turned.

A seat A is mounted to the rearward portion of the frame.

What is claimed is:

1. A machine of the class described, comprising a frame, a plow connected with the frame, a laterally extending carrier arranged to receive from the plow, traction and supporting wheels connected with the frame, operative connections between said wheels, said connections including clutches means for transmitting power from said wheels to the carrier, said means including a clutch, and means for operating the several clutches simultaneously.

2. In a machine of the class described, the combination with a frame, of vertically movable traction and supporting wheels, means for moving the supporting wheel vertically, means for holding the traction wheel yieldably against vertical movement, operative connections between the wheels, said connections including chains and clutches, bodily movable idler sprockets for the chains, and means for operating the clutches and for moving the idler sprockets simultaneously.

3. A machine of the class described, comprising a frame, a plow carried by the frame, a carrier arranged to receive from the plow and pivoted for vertical movement, means for moving the carrier pivotally, said carrier being also arranged for bodily vertical movement, means for moving the carrier bodily a vertically movable ground wheel connected with the frame, means for holding the ground wheel yieldably against upward movement, a side draft bar connected with the frame, and with the carrier, traction and supporting wheels connected with the frame, operative connections between the traction and supporting wheels and the carrier and a tracker wheel for the plow.

4. In a machine of the class described, the combination with a frame, of a guide in the frame, a slide mounted in the guide for vertical movement, a traction wheel connected with the slide for movement therewith, an operative mechanism connected with the traction wheel for vertical movement therewith, a bracket, an operating rod pivotally and slidably mounted in the bracket and connected with the operative member for operation thereof when the rod is moved pivotally, and means for moving the rod pivotally.

5. In a machine of the class described, the combination with a frame, of a vertically movable wheel carried by the frame, means for moving said wheel vertically, a vertical rod slidably connected with the frame, a sprocket revolubly mounted at the lower end of the rod, clutch connections between the sprocket and said wheel, said rod being movable laterally to operate the clutch, a sprocket journaled in the vertical plane of the first named sprocket, a chain engaging with the two sprockets, a lever in the frame, connections between the lever and the rod for movement of the rod to operate the clutch when the lever is moved, and an idler connected with the lever and engaged in the chain, said idler being arranged for movement to slacken the chain when the lever is moved to throw out the clutch.

6. In a machine of the class described, the combination with a frame, of vertically movable traction and supporting wheels carried by the frame, a plow carried by the frame, means for moving the supporting wheel to vary the position of the plow, a sprocket for each of the wheels, clutch connections between the sprockets and their respective wheels, a second pair of sprockets, chains engaged with the first and second named sprockets, vertical members connected with the clutches and arranged for lateral movement to operate said clutches, said members being connected with the frame for vertical movement with their respective wheels, a carrier, clutch connections between the traction wheel and the carrier for operation of the latter, a lever in the frame, connections between the lever and the vertical rods for movement of the latter to operate the clutches when the lever is moved idlers connected with the lever and engaging the chains, and arranged for movement to slacken the chains when the clutches are thrown out, connections between the clutch mechanism of the carrier and the lever, operable to throw out said clutch when the first named clutches are thrown out, means for holding the traction wheel yieldably against upward movement, one of said idlers being movable independently of the lever, and a spring arranged to move said idler to compensate for slackening of the corresponding chain.

7. In a machine of the class described, the combination with beams of a member extending between the beams, a second member connected with the beams and having a convex face directed away from the first named member, arms pivotally connected with the first named member and extending beyond the second named member, a roller carried by one of the arms and resting against the convex face of the second member for movement thereover, a clevis plate carried by the arms, and means for holding the arms at different points of their pivotal movement.

8. In a machine of the class described, the combination with a support, of a share, fastening devices engaged in the share and in the support and blades carried by the fastening devices and extending above the share.

9. In a machine of the class described, the combination with a frame, of a vertical guide carried by the frame, a member slidably mounted in the guide, means for moving the member vertically, means for holding the moving means with the member at different points of its movement, an arm pivoted to the lower end of the member for horizontal movement, a vertical wheel carried by the arm, and means movable into and out of operative position for holding the arm against pivotal movement.

10. In a machine of the class described, the combination with a frame, of an elevator pivotally connected with the frame, rack bars mounted upon the elevator for vertical movement with respect thereto, rack segments meshing with the rack bars and arranged for movement to move the rack bars vertically, a lever pivotally connected with the frame, connections between the lever and the segments for movement of the segments when the lever is moved, and supporting wheels carried by the rack bars.

11. In a machine of the class described, the combination with a frame, of a guide connected with the rearward portion of the frame and lying at one side thereof, a laterally extending carrier located forwardly of the guide, a vertically movable slide in the guide, means for holding the slide yieldably against upward movement, a ground wheel carried by the slide, a forwardly extending member connected with the guide, said elevator being connected with the member for movement with respect thereto, and a side draft bar connected with the member and with the frame.

12. In a machine of the class described, the combination with a frame, of wheel-supporting means carried thereby at one side thereof, a wheel connected with said supporting means, a vertically movable carrier connected with the frame and lying forwardly of said wheel, a member secured to the supporting means and extending forwardly therefrom, said elevator being connected with the member for vertical movement with respect thereto, and a side draft bar connected with the member and with the frame.

13. In a machine of the class described, the combination with power transmitting mechanism, including a clutch, of a bracket, a lever connected with the clutch and engaged in the bracket for movement to operate the clutch, a sprocket carried by the clutch, a power receiving shaft, a sprocket carried by the power receiving shaft, a chain engaged with the sprockets, an arm carried by the bracket, a lever pivoted to the arm, an idler sprocket carried by the lever and engaging the chain, said lever being movable to bring the idler out of engagement with the chain, a guide included in the bracket a finger carried by the lever and entering the guide and a spring engaged between one end of the guide and the finger, and arranged to hold the lever yieldably with the idler in engagement with the chain.

14. In a machine of the class described, the combination with a frame, of a plow carried by the frame, cross members secured to the frame and having downwardly turned end portions at one side of the frame, said end portions having their edge portions bent to form guides, members slidably mounted in the guides for vertical movement, a shaft journaled at the lower ends of the members, a carrier pivoted upon the shaft, said carrier including an apron engaged with the shaft for operation thereby, means for moving the carrier pivotally, means connected with the members for movement of the latter, and means for driving the shaft.

In testimony whereof, I affix my signature, in presence of two witnesses.

GEORGE W. BARNETT.

Witnesses:
 JULIUS PETERSON,
 J. M. ISAACSON.